2,970,549
TRANSPORT CARRIAGE FOR VEHICLES

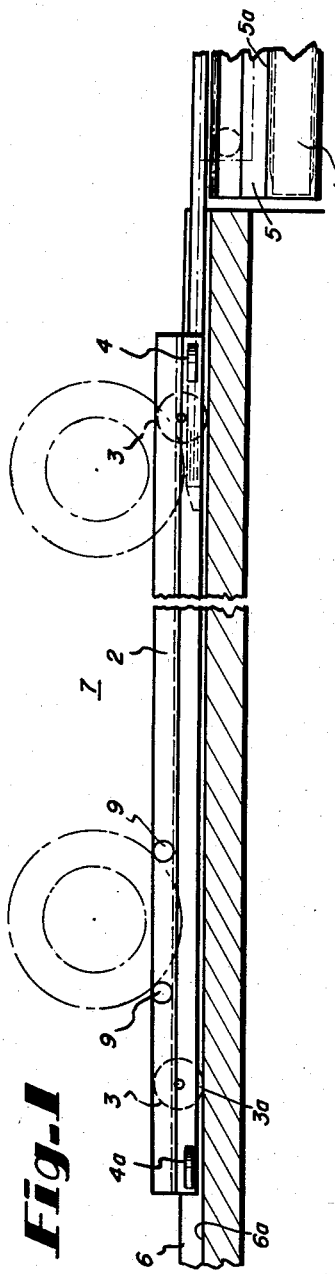

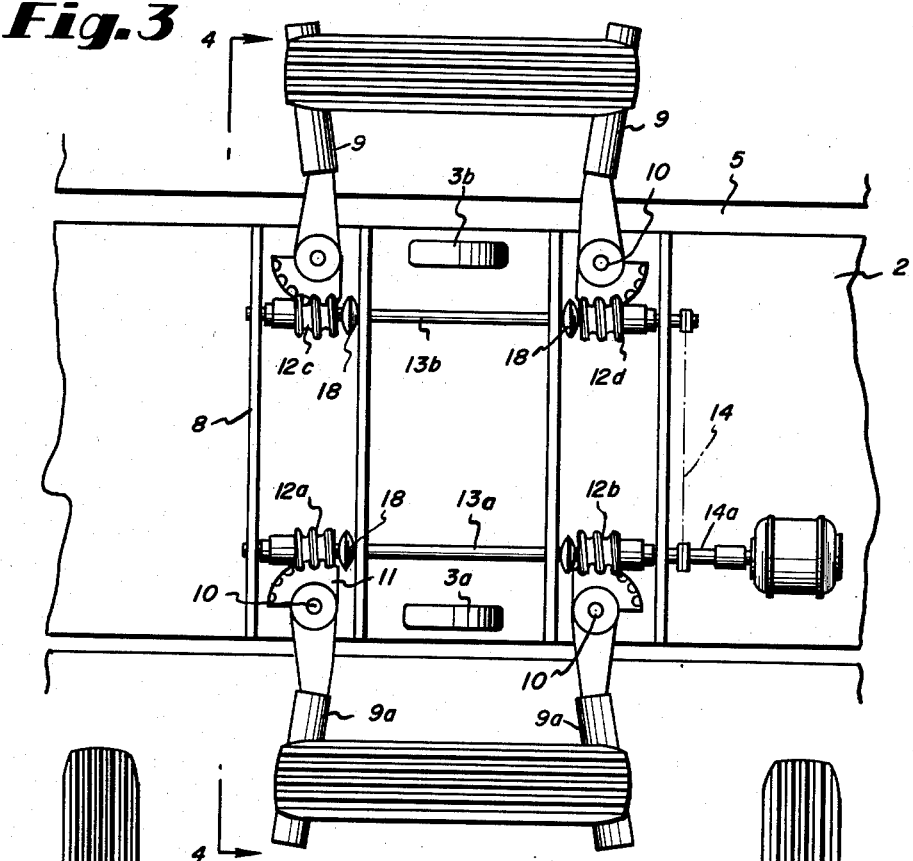
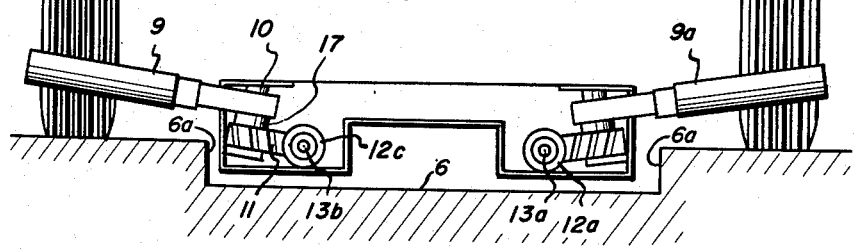

Heinrich Volk, Mainz, and Arnulf Dechant, Gustavsburg, Germany, assignors to Man, Maschinenfabrik Augsburg-Nurnberg A.G., Nurnberg, Germany Filed July 8, 1957, Ser. No. 670,618

Claims priority, application Germany Sept. 11, 1956

2 Claims. (Cl. 104—50)

The present invention relates to a transport carriage for motor vehicles and more particularly to a transport carriage for conveying motor vehicles into and out of the boxes of a parking garage.

It is known in the art to provide transport carriages for conveying vehicles in parking buildings such as for instance a multi-storey garage. These transport carriages are provided with swinging adjustable catch levers. A pair of these catch levers laterally arranged upon the frame of the transport carriage can be pressed against a coaxial pair of wheels of the motor vehicle whereupon the vehicle caught with its wheels between the catch levers is lifted. After the vehicle has been lifted it is conveyed by the transport carriage into the box of the garage or out of this box.

The transport carriages of the type just described are complicated, expensive and do not operate with a sufficient degree of reliability and at the desirable speed. Complicated and expensive devices are necessary in order to raise the vehicle and lift its wheels from the ground prior to transportation by the carriage. Before the vehicle can be lifted, the catch levers have to be firmly fastened to the wheels of the vehicle in order to secure the vehicle during the lifting operation and a further fixing operation of the catch levers is required after the vehicle has been raised in order to secure the vehicle in its raised position. The lifting and securing operations are time consuming and the known transport carriages therefore do not operate with the speed which is necessary in order to speed up the parking operation and exploit the parking capacity of the garage to the highest possible degree. It may also occur that the vehicle slips from the grip of the catch levers and has to be fixed, lifted, and secured in its raised position for a second time.

With the foregoing in mind it is an object of the present invention to provide a transport carriage for conveying vehicles particularly in a parking garage which is comparatively simple and inexpensive.

It is another object of the present invention to provide a transport carriage for conveying vehicles particularly in a parking garage which is more reliable and operates at greater speed than known carriages.

It is still another object of the present invention to provide a transport carriage for conveying vehicles particularly in a parking garage which does not require lifting of the vehicle prior to its transportation.

It is yet another object of the present invention to provide a transport carriage for conveying vehicles, particularly in a parking garage, in which a pair of coaxial wheels of the vehicle is caught between two pairs of catch levers in which the wheels of the vehicle are prevented from leaving the grip of the catch levers irrespective of sudden shocks of the transport carriage.

It is a further object of the present invention to provide a transport carriage for conveying vehicles, particularly in a parking garage, in which a pair of coaxial wheels of the vehicle is caught between two pairs of catch levers which is applicable to all types of vehicles irrespective of the size and diameter of the wheels of the vehicle.

It is still a further object of the present invention to provide a transport carriage for conveying vehicles, particularly in a parking garage, in which a pair of coaxial wheels of the vehicle is caught between two pairs of catch levers and in which the catch levers maintain an even grip upon the wheels of the vehicle without putting an excessive load on the motor displacing the catch levers.

These objects are achieved by the transport carriage of the present invention having hingedly mounted swinging catch levers adapted to grip a pair of coaxial wheels of the vehicle in a plane substantially parallel to the common axis of the pair of wheels so that the vehicle can be conveyed upon its proper wheels without requiring any lifting prior to its transportation. In order to avoid friction between the wheels of the vehicle and the catch levers in their operative position in which they come to rest firmly against the tire of the wheels, the catch levers are preferably surrounded with rolls, one cylindrical roll being rotatably positioned upon each of the catch levers.

According to another embodiment of the present invention, the catch levers are so constructed that in their operative position they come to rest against the wheels of the vehicle in a position in which their respective free ends point in an oblique, upward direction.

According to still another embodiment of the present invention, the catch levers are brought into their operative position by driving and transmission means which are equipped with means limiting the torque of the levers whenever the latter meet a resistance, for instance, if they come to rest against the wheels of the vehicle.

These means may consist, for example, of worm gears turning the catch levers, and spring plates resiliently supporting the worm gears.

According to yet another embodiment of the present invention, the driving means for the catch levers of the transport carriage are equipped with selflocking gear means.

It is also of advantage to equip the transport carriage of the present invention with a pair of trailing wheels arranged on an axis extending in the same plane in which the axis for the wheels of the motor vehicle caught between said catch levers extends and adapted to support the carriage while moving the vehicle.

The present invention will be better understood upon the following detailed description of the accompanying drawings, wherein:

Figure 1 is a side view of the transport carriage of the present invention in which the catch levers have been swivelled into their operative position;

Figure 2 is a top view of the transport carriage of the present invention again with the catch levers in their operative position;

Figure 3 is a top view of a part of the transport carriage of the present invention and shows the embodiment in which the catch levers are arranged in a position with their respective free end pointing in an oblique upward direction;

Figure 4 is a sectional view taken along the lines IV—IV of Figure 3 and shows one catch lever of each pair in its operative position.

Referring now to the drawings more in detail, the vehicle is conveyed by a carriage 2 between the cage or platform 1 of the elevator of a parking garage, for instance of a multi-storey garage, and the individual boxes or stalls 7 of the garage. The length of the carriage is so chosen that it can be used for all types of vehicles which are to be parked in the garage, as for example cars, trucks, buses and so forth.

The floor of the platform 1 and the floors of the individual boxes 7 are each formed with a groove which extends in the direction of travel of the carriage 2, the groove of the platform 1 having a bottom surface 5 and two side walls 5a and the groove of each box 7 having a bottom surface 6 and two side walls 6a. The cross-section of one of these grooves may best be seen from Fig. 4.

The conveyor carriage 2 having a frame or chassis 8 is provided with a first pair of wheels 3 and a second pair of wheels 3a. The carriage is further provided with guide rolls 4 at its front and rear ends, each guide roll having a vertical axis. The wheels 3, 3a run on the bottom surfaces 5, 6 of the platform and the boxes, whereas the guide rolls 4 run along the side walls 5a, 6a and thereby prevent sideways movement of the carriage 2.

According to the present invention the transport carriage is provided with two pairs of catch levers 9 and 9a arranged on both sides of the frame 8 of the carriage 2. The catch levers are preferably arranged closer to one of the ends of the carriage, and are rotatably mounted on axes 10, which, in turn, are fixedly arranged in the frame 8 of the carriage and extend vertically relative to the plane in which the carriage extends. The catch levers 9 and 9a can be swivelled around their respective axes from a position in which their longitudinal extension substantially coincides with the lateral frames of the carriage to a position in which they protrude from the lateral frames of the carriage and form an angle of 90° with the latter. This swivelling motion is effected by the following driving and transmission means:

Segments 11 are fixedly mounted on the axes 10. These segments are provided with worm threadings which engage worm gears 12, in such a manner as to be self-locking.

The worm gears 12a and 12b for the pair of catch levers 9a are mounted upon a shaft 13a and the worm gears 12c and 12d for the pair of catch levers 9 are mounted upon a shaft 13b, with both shafts 13a and 13b extending parallel to the longitudinal extension of the transport carriage 2, and they are connected to each other by a chain transmission 14 driven by the motor 15. Thus, the shaft 13a and the shaft 13b are rotated by the motor 15 in the desired direction, and consequently, the pairs of catch levers 9 and 9a are swung into their operative position from the resting position and vice versa depending upon the direction in which the shafts 13a and 13b are rotated by the motor 15, via the shaft 14a. The range in which the catch levers are displaced from their resting position to their operative position and vice versa, is indicated by the arrows in Figure 2.

In the operative position the catch levers get hold of two coaxial wheels of the vehicle, preferably the rear wheels, the pair of catch levers 9 coming to rest against one wheel and the pair of catch levers 9a against the other wheel. In the resting position, the two catch levers of each pair extend parallel to the lateral side of the transport carriage substantially coinciding with the outer edge of the latter, with their respective ends pointing in opposite direction relative to each other. The catch levers remain in this resting position while the transport carriage is moved underneath a motor vehicle to be conveyed by the carriage. Thereafter the catch levers are turned by the drive and transmission means mentioned above by approximately 90° until they come to rest against the tires of a pair of coaxial wheels of the vehicle. After the vehicle has been moved to its point of destination by means of the transport carriage and its catch levers, the latter are again returned to their resting position (schematically indicated by the dashed lines in Figure 2). In order to avoid friction between the catch levers and the wheels of the vehicle during the transportation of the latter, the catch levers are preferably provided with rolls, one cylindrical roll being rotatably mounted, for instance by means of ball bearings, upon each catch lever and rotating while the wheels of this vehicle revolve during the transportation.

The displacement of the transport carriage 2 with the motor vehicle from the platform 1 of the elevator to the entrance or exit and to the boxes 7, and from these boxes back to the platform 1 of the elevator is effected in a manner known per se. Usually, the carriage is moved by a cable which is driven by a stationary motor.

While the transport carriage used in a parking garage is conventionally displaced by a cable, it is, of course, also possible to devise a transport carriage equipped with a motor of its own.

The catch levers can be swivelled by the mechanical driving and transmission means described further above. It is, however, also possible to use hydraulic or pneumatic driving and transmission means.

It may sometimes occur during the transportation of a motor vehicle by a transport carriage that the wheels of the motor vehicle run over the adjoining catch lever, thereby removing the vehicle from the grip of the latter. This may occur particularly during the starting or in case of a stopping of the transport carriage. It may also occur if the transport carriage does not run smoothly and in case of sudden shocks especially during the start, or a braking or also if the elevator has not stopped exactly upon the same level with the boxes and a small difference in height has to be overcome by the carriage.

These dangers are avoided by another embodiment of the present invention shown in Figures 3 and 4 of the accompanying drawings, in which the catch levers are so adjusted upon the carriage that in the operative position their respective free ends point in oblique upward direction. This position is due to the oblique arrangement of the axes 10 of each of the catch levers which are inclined towards the plane in which the carriage extends (see Figure 4). Each of the axes 10 is provided with a surrounding sleeve 17, at the upper end of which there is mounted a catch lever 9 and at the lower end of which there is fixedly attached the segment 11.

Because of this arrangement of the catch levers their respective points of application to the tires of the wheels of the vehicle are raised and consequently the wheels of the vehicle are prevented from running over the adjoining catch levers, and hence from leaving the grip of the latter and their connection to the transport carriage. It is not feasible to exclude this possibility by positioning the catch levers so as to come to rest against the tire at their upper portion but not in an oblique upwardly pointing direction because in that case there is not enough space left in which the transport carriage could be placed underneath the chassis of the vehicle.

The point of inclination of the catch levers obliquely arranged according to this embodiment of the invention is so chosen that the varying points of application of the catch lever to the wheel depending upon the particular type and size of the vehicle are sufficiently high to prevent the wheels from leaving the grip of the catch lever.

While this arrangement prevents the wheels of the motor vehicle from leaving the catch levers, the difference in height between one level upon which the transport carriage is actually moving, and another, adjoining level upon which it is to pass and which can be safely overcome by the transport carriage is nevertheless limited to a maximum of approximately 25 mm. This is due to the fact that the frame and particularly its central portion hits against the protruding edge of the higher level if the difference in height exceeds 25 mm. This can be avoided according to the present invention by providing the transport carriage with wheels 3b mounted underneath the transport carriage between the axes 10 and 10a for each pair of catch levers 9 and 9a as shown in Fig. 3. The wheels 3b have a common axis extending in the same vertical plane in which extends the axis for the wheels of the motor vehicle to be caught between the catch levers. A difference in height between a level upon which the transport carriage is actually moving and another level upon which it is to pass has to be overcome simultaneously both by the wheels of the motor vehicle transported by the carriage and the trailing wheels of the latter. Due to this arrangement, a practically unlimited difference in height can be safely overcome.

The catch levers of the transport carriage of the present invention are to be applied to all types of vehicles having wheels of various diameters. In order to insure a firm grip of the catch levers and on the other hand to avoid too firm a grip and an excessive pressure upon the tires of the vehicle, especially if the vehicle assumes a position relative to the transport carriage in which the axis of the wheels extends not exactly parallel relative to the transverse axis of the transport carriage, means are provided for adjusting the position of the catch levers to the particular size and position of the wheels of the motor vehicle. According to this embodiment of the invention, the transmission means arranged between the catch lever and the driving means swivelling the catch lever is provided with means causing the driving means to slip as soon as the catch lever meets with a predetermined degree of resistance to its swivelling motion. Such means are known in the art and need not be exhaustively described in detail. By way of example, Figure 3 shows one possibility according to which the worm gears 12 are resiliently positioned upon spring plates 18 mounted upon axis 13a and 13b, respectively.

It is also possible to provide the transmission means with a sliding clutch, or to use a motor having a limited capacity so that the motor is incapable of increasing the torque of the catch levers as soon as the latter encounter a predetermined resistance.

The transport carriage of the present invention has numerous advantages compared to known constructions. It operates faster and is less expensive, because the motor vehicle is conveyed on its proper wheels and it is therefore unnecessary to lift the vehicle from the ground. The complicated and expensive means for lifting the motor vehicle and securing it in its lifted position can be dispensed with.

Due to the arrangement of the catch levers pointing in their operating position in an oblique, upward direction, the wheels of the vehicle are prevented from rolling over the catch levers and the vehicle therefore cannot leave the grip of the catch levers even in case of sudden shocks of the carriage. Because of the arrangement of the trailing wheels practically all differences in height between a level on which the carriage actually moves and a level on which it is to pass can be safely overcome.

A harmful pressure of the catch levers against the tires of the wheels of the vehicle is avoided due to the torque limiting means. Because of these means the transport carriage with its catch levers is applicable to all types of vehicles having wheels of the most various sizes and diameters. Due to the resilient operation of the transmission means, the catch levers exert an even and uniform grip on wheels of all sizes and diameters.

Because of the selflocking worm gears the catch levers maintain an even grip on the wheels of the vehicle without putting an excessive load on the motor driving the catch levers.

While the transport carriage of the present invention is particularly useful in a parking garage it can of course also be employed elsewhere for the purpose of conveying motor vehicles, for example in automobile plants for conveying the finished car away from the assembly line.

It will be understood that this invention is susceptible to modification in order to adapt it to different usages and conditions, and, accordingly, it is desired to comprehend such modifications within this invention as may fall within the scope of the appended claims.

What we claim is:

1. A motor vehicle transfer carriage for a vehicle parking system and comprising a wheeled frame, two pairs of shafts mounted on both longitudinal edges of said frame opposite from each other, said shafts being inclined from the vertical toward a central vertical plane passing through the longitudinal axis of said frame, two pairs of catch levers pivotally mounted on said shafts, a cylindrical roller journaled on each of said catch levers, means for pivoting said catch levers from an inoperative resting position substantially parallel to the frame longitudinal edges to an operative position wherein said levers extend outwardly of said frame at substantially right angles to their inoperative positions so that each pair of levers engages one of a pair of coaxial wheels on a motor vehicle, the free ends of said catch levers being inclined upwardly from the horizontal when in operative position, and means connected with said pivoting means for stopping the pivoting movement of said levers to their operative position when said levers encounter a pre-determined resistance.

2. A motor vehicle transfer carriage for a vehicle parking system and comprising a wheeled frame, two pairs of shafts mounted on both longitudinal edges of said frame opposite from each other, said shafts being inclined from the vertical toward a central vertical plane passing through the longitudinal axis of said frame, two pairs of catch levers pivotally mounted on said shafts, a driving shaft for each of said pairs of catch levers, a motor having transmission means therefor, said motor being drivingly connected to said catch levers by means of said driving shaft and said transmission so as to pivot said catch levers from their inoperative positions to the operative positions at substantially right angles to the frame of the carriage so that the free ends of said catch levers are inclined upwardly from the horizontal and rest firmly against the coaxial wheels of the motor vehicle, and means connected with said pivoting means for stopping the pivoting movement of said levers to their operative position when said levers encounter a pre-determined resistance when coming in contact with the wheels of the motor vehicle.

References Cited in the file of this patent

UNITED STATES PATENTS

| | | |
|---|---|---|
| 1,817,220 | Young | Aug. 4, 1931 |
| 1,886,588 | Riblet | Nov. 8, 1932 |
| 1,962,127 | Balkema et al. | June 12, 1934 |
| 2,016,662 | Aitken | Oct. 8, 1935 |
| 2,626,718 | Weber | Jan. 27, 1953 |
| 2,801,011 | Overlach et al. | July 30, 1957 |
| 2,859,704 | Howard | Nov. 11, 1958 |

FOREIGN PATENTS

| | | |
|---|---|---|
| 714,598 | Great Britain | Sept. 1, 1954 |
| 1,127,134 | France | Aug. 6, 1956 |